June 8, 1937.   E. A. CONDIT   2,083,316
INSULATED RAIL JOINT
Filed Feb. 11, 1936   2 Sheets—Sheet 1
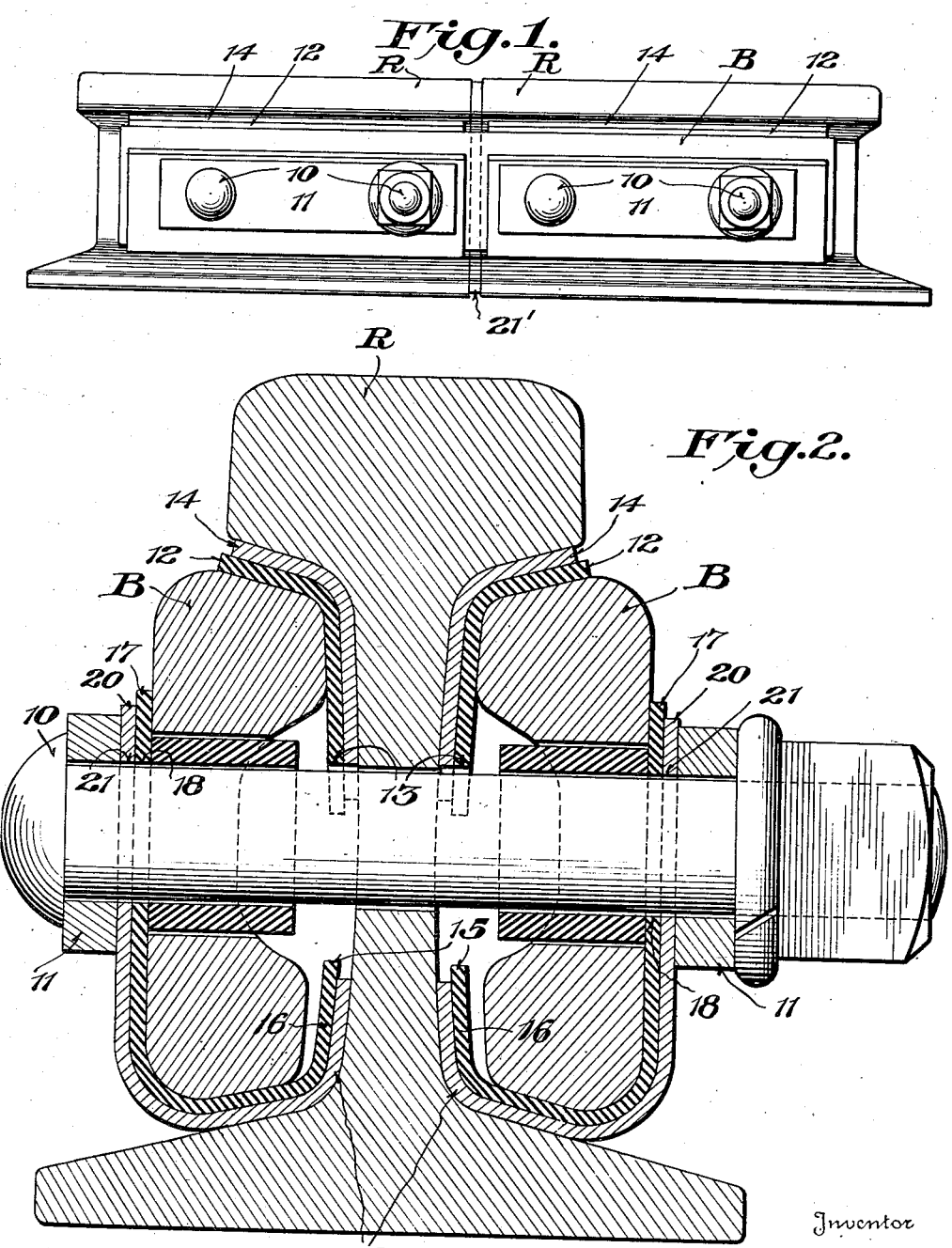
Inventor
E. A. Condit, June 8, 1937.　　　　E. A. CONDIT　　　　2,083,316
INSULATED RAIL JOINT
Filed Feb. 11, 1936　　　　2 Sheets-Sheet 2
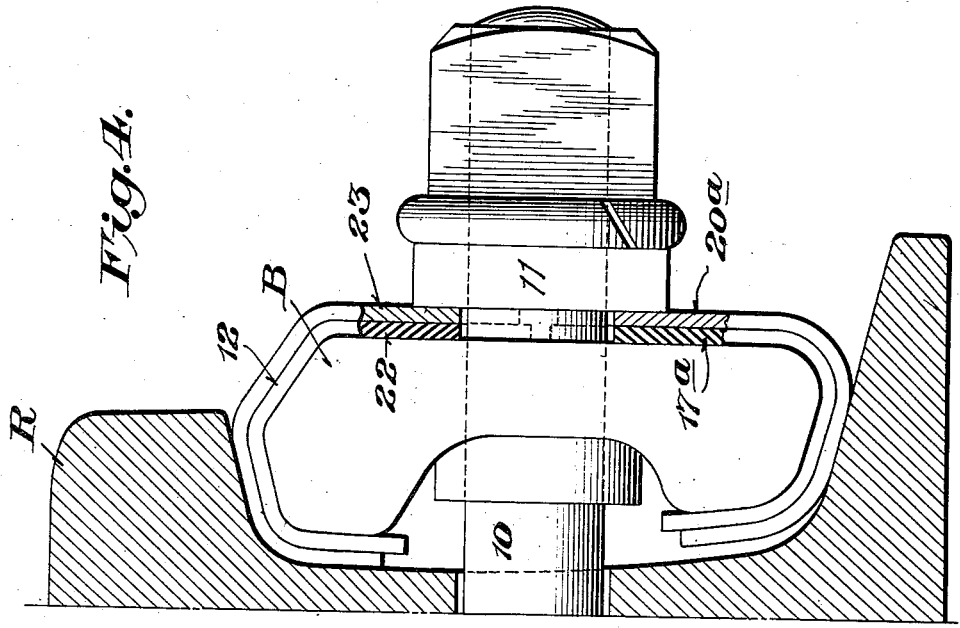
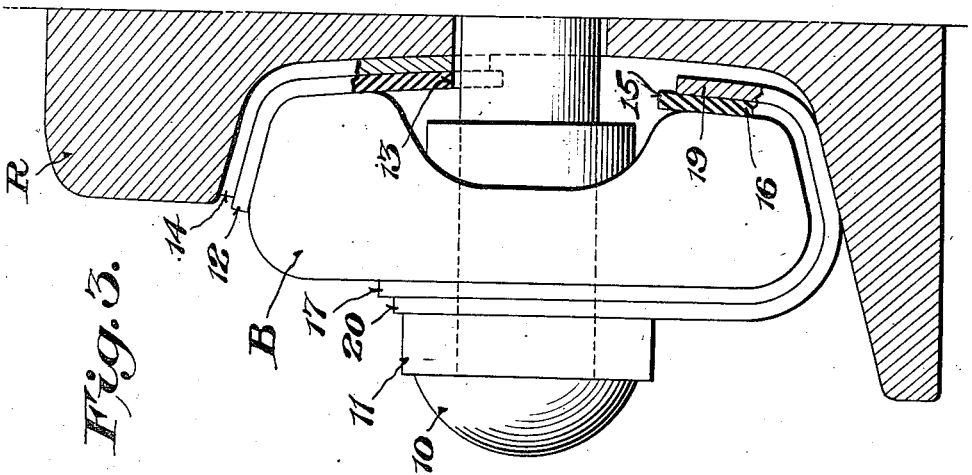
Inventor
E. A. Condit,
By
Attorney Patented June 8, 1937

2,083,316

UNITED STATES PATENT OFFICE 2,083,316

INSULATED RAIL JOINT

Edward A. Condit, Montclair, N. J., assignor, by mesne assignments, to Poor & Company, a corporation of Delaware Application February 11, 1936, Serial No. 63,420

1 Claim. (Cl. 238—159)

This invention relates to insulated rail joints, and has particular reference to a novel, armored base insulating means for rail joints, and also to a novel combination of said base insulating means with an armored head insulating means.

In practically all rail joints there occurs relative longitudinal movement between the splice bars and the rails, and if the joint should become loose there also occurs relative lateral movement between the splice bars and the rails which is quite pronounced at the base of the joint. Therefore, if a sheet of insulation is interposed between a splice bar and a rail with its outer and inner faces in direct contact with the splice bar and the rail, respectively, it is subjected to an intense abrasive action by either the splice bar or the rail, or by both, and as a consequence it possesses only short life. In this connection the general practice heretofore has been to interpose the base piece of insulation between the splice bar and the rail in direct contact with both the splice bar and the rail, even in constructions where provision is made to reduce the abrasion and wear on the head piece of insulation. Frequent, expensive renewals of the base insulation have, therefore, been required.

Accordingly, one important object of the present invention is to provide a base insulating means for rail joints wherein the base insulation is protected against abrasion, thereby to increase the life of the insulation and correspondingly to reduce the frequency of renewals thereof.

Another object of the invention is to provide a base insulating means for rail joints wherein the insulating material is protected against the deteriorating effects of the elements.

Another object of the invention is to provide a base insulating means for rail joints wherein the insulating material is protected against abrasion and from the elements, and wherein provision is made to permit all necessary adjustments of the joint to maintain the same tight.

Another object of the invention is to provide, in an insulated rail joint, a novel combination of head and base insulating means and joint fastening means, whereby the head and base pieces of insulation are completely shielded and protected from the elements.

With the foregoing and other objects in view, which will become more fully apparent as the nature of the invention is better understood, the same consists in the novel combination of features as will be hereinafter more fully described, illustrated in the accompanying drawings and defined in the appended claim.

In the accompanying drawings:

Figure 1 is a side elevation of an insulated rail joint constructed in accordance with the invention.

Figure 2 is a cross section through the joint shown in Figure 1; and

Figures 3 and 4 are views similar to Figure 2 illustrating modifications of the invention.

Referring to the drawings in detail, first with particular reference to the practical embodiment of the invention illustrated in Figures 1 and 2, R, R designate the meeting end portions of a pair of rails and B designates a splice bar, preferably but not necessarily of the toeless type, which, in conjunction with joint bolts 10 and an elongated washer plate 11, serves to connect said rail ends together.

At the top of the joint is a head piece of insulation, designated as 12, which extends across the top of the splice bar and downwardly over the upper portion of the inner face thereof preferably to the joint bolts 10, where it is notched, as indicated at 13, to accommodate said bolts, whereby it is held by the latter against longitudinal movement relative to the splice bar.

Covering the piece of insulation 12 and interposed between the latter and the rail is a metallic shield 14 including an inner portion which is substantially coextensive with the inner portion of the insulation and which also is notched to accommodate the joint bolts whereby said shield is held against longitudinal movement relative to the underlying insulation.

At the bottom of the joint is a base piece of insulation of substantially U-shape in cross section, designated as 15, which extends across the bottom of the splice bar and upwardly over the lower portions of the inner and the outer faces thereof as indicated at 16 and 17, respectively. As shown, the outer portion 17 of this piece of insulation extends upwardly to the joint bolts 10 where it is provided with suitable openings or recesses 18 to receive said joint bolts whereby, as in the case of the head piece of insulation 12, it is held against longitudinal movement relative to the splice bar.

Covering the base piece of insulation 15 and interposed between the latter and the rail is a metallic shield 19 which also is of substantially U-shape in cross section and which has its outer portion 20 extending upwardly to the joint bolts and provided with suitable openings or recesses 21 accommodating said bolts, whereby said shield is held against longitudinal movement relative to the base piece of insulation.

When the joint bolts are tightened the head and base pieces of insulation and also the metallic shields covering said pieces of insulation, are clamped against the splice bar and are held effectively against any lateral or longitudinal movements relative to the splice bar. It follows, therefore, that any abrasion and wear occurs between the rail and the metallic shields in contact therewith and that the insulation pieces are practically relieved of all abrasion and wear, whereby they possess long life. Moreover, due to the outer side portion 20 of the lower shield being disposed in covering relationship to the outer side portion 17 of the base piece of insulation, and to the remaining portions of said base piece of insulation being covered by the splice bar, it is apparent that the base insulation is completely protected against the deteriorating effects of the elements.

At the base of the joint provision is made for inward adjustment of the splice bar B to compensate for wear. In this connection the upwardly extending portion 16 of the base piece of insulation may be normally spaced from the inner face of the splice bar, as shown in Figure 2, or said portion 16 of the base piece of insulation may be constantly in contact with the inner face of the splice bar and the upwardly extending inner side portion of the base shield 19 may be normally spaced from the rail, as shown in Figure 3.

Between the ends of the rails is interposed, as usual, an insulating end post 21'. In this connection, the head and base pieces 12 and 15 of insulation may be continuous throughout the length of the joint and only the shields 14 and 19 need be formed in two sections with the respective sections of each shield disposed to opposite sides of the end post 21', or the head and base pieces of insulation may also be formed each in two sections as in the case of the shields therefor. Preferably the latter construction is employed to enable either end portion of either the head or the base insulation to be renewed independently of the other end portion thereof.

Figure 4 of the drawings illustrates a particularly desirable embodiment of the invention according to which the washer plate or bar 11 cooperates with outer portions of the upper and lower shields to completely cover and protect the head and base pieces of insulation against the elements. The head piece of insulation is extended downwardly over the upper portion of the outer face of the splice bar, as indicated at 22, and the shield for said head piece of insulation likewise is extended downwardly in covering relationship to said insulation portion 22, as indicated at 23. Preferably both of the portions 22 and 23 extend to the joint bolts 10 and are notched to accommodate said bolts, whereby both the insulation and the shield are held against movement relative to the splice bar. In any event, said portions 22 and 23 extend downwardly sufficiently far so that the washer plate 11 overlies their lower marginal portions. Similarly, the base piece of insulation is extended upwardly over the lower portion of the outer face of the splice bar, as indicated at 17a, and the outer portion of the shield for said base piece of insulation is extended upwardly in covering relationship to said insulation portion 17a as indicated at 20a. Moreover, as in the case of the outer portions of the head insulation and shield, the portions 17a and 20a of the base insulation and shield, respectively, preferably extend upwardly to the joint bolts 10 and are notched to accommodate said bolts, whereby said base insulation and shield are held against movement relative to the splice bar. In any event, said portions 17a, 20a extend upwardly sufficiently far so that the washer plate 11 overlies their upper marginal portions. Thus, obviously, said plate cooperates with the portions 23 and 20a of the upper and the lower shield elements to completely cover and protect the head and base pieces of insulation.

In the construction illustrated in Figure 4 the base piece of insulation and the shield therefor may have their inner, upwardly extending portions hugging the inner face of the splice bar and spaced from the rail, as shown, or the arrangement may be as illustrated in Figure 2 wherein said portions are spaced from the splice bar.

Without further description it is thought that the features and advantages of the new construction will be readily understood. It is desired to point out, however, that while only certain specific embodiments of the invention have been illustrated and described, the invention is capable of embodiment in other mechanically different structures within its spirit and scope as defined in the appended claim.

I claim:—

In a rail joint, the rails, a splice bar and cooperating joint fastener elements connecting the rails together, a head piece of insulation and an overlying metallic shield both extending across the top of the splice bar and downwardly over the upper portion of the outer face thereof, a base piece of insulation and a covering metallic shield both extending across the bottom of the splice bar and upwardly over the lower portion of the outer face thereof, the top edges of said base piece of insulation and its overlying metallic shield being disposed below the bottom edges of the head piece of insulation and its overlying metallic shield, and a bar secured by the joint fastener elements against the lower and the upper marginal portions of the outer side portions of said shields, respectively, and covering the space between said marginal portions.

EDWARD A. CONDIT.